(12) United States Patent
Bergsma et al.

(10) Patent No.: US 7,146,730 B2
(45) Date of Patent: Dec. 12, 2006

(54) MOUNTING A PASS-THROUGH ON A PLASTIC FUEL TANK

(75) Inventors: Rudolph Bergsma, deceased, late of Ann Arbor, MI (US); by Rosemary Bergsma, legal representative, Ann Arbor, MI (US); Robert P. Benjey, Dexter, MI (US); Carl Binder, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 381 days.

(21) Appl. No.: 10/662,790

(22) Filed: Sep. 15, 2003

(65) Prior Publication Data

US 2005/0055830 A1  Mar. 17, 2005

(51) Int. Cl.
*B21D 51/16* (2006.01)

(52) U.S. Cl. .............................. 29/890.124; 29/890.12; 137/588

(58) Field of Classification Search ........... 29/890.124, 29/890.12; 137/587, 588
See application file for complete search history.

(56) References Cited

U.S. PATENT DOCUMENTS

| | | | |
|---|---|---|---|
| 4,947,970 A | 8/1990 | Miller et al. | |
| 4,960,153 A * | 10/1990 | Bergsma | 137/587 |
| 5,020,662 A | 6/1991 | Aida | |
| 5,083,583 A * | 1/1992 | Benjey | 137/587 |
| 5,660,206 A * | 8/1997 | Neal et al. | 137/592 |
| 6,260,578 B1 * | 7/2001 | Kuehnemund et al. | 137/592 |
| 6,308,735 B1 * | 10/2001 | Foltz | 137/587 |
| 6,637,778 B1 * | 10/2003 | Benjey | 285/209 |
| 2003/0051969 A1 | 3/2003 | Reinards et al. | |
| 2003/0094763 A1 * | 5/2003 | Benjey | 277/314 |

FOREIGN PATENT DOCUMENTS

GB   2 165 914 A   4/1986

OTHER PUBLICATIONS

PCT International Search Report, PCT/IB2005/001625, search completed Oct. 20, 2005.

* cited by examiner

*Primary Examiner*—Marc Jimenez
(74) *Attorney, Agent, or Firm*—Anna M. Shih; Roger A. Johnston

(57) ABSTRACT

A method of mechanical twist lock attachment of a pass-through valve or fitting over an aperture in a plastic fuel tank having an embedded vapor barrier layer. A ring having circumferentially spaced internal lugs is secured to the tank by weldment around an aperture in the tank wall exposing an edge of the barrier layer. A seal ring on the pass-through is located in the aperture to seal the exposed vapor barrier edge. Outwardly extending projections on the pass-through attach the pass-through by twist locking engagement with the projections on the ring.

9 Claims, 2 Drawing Sheets

MOUNTING A PASS-THROUGH ON A PLASTIC FUEL TANK

BACKGROUND OF THE INVENTION

The present invention relates to motor vehicle fuel tanks and particularly fuel tanks formed of plastic material and more particularly to plastic fuel tanks formed of plastic material not impervious to fuel vapor and having a vapor barrier associated with the wall of the tank to prevent permeation of fuel vapor through the tank wall.

Control of fuel vapor permeation through fuel tanks is now required on all vehicles operating on volatile hydrocarbon fuels in order to prevent fuel vapor from entering the atmosphere. The invention relates more particularly to plastic fuel tanks for motor vehicles having a vapor barrier layer embedded or molded in the plastic wall of the tank where the vapor barrier layer is typically formed of a dissimilar plastic material from that of the tank wall structure.

Where it is necessary to provide an aperture in the tank wall for attachment of fittings to the tank, it has been found that when the aperture is formed in the tank wall the break in the vapor barrier creates an area where fuel vapor can permeate through the wall of the tank and escape to the atmosphere. Accordingly, it has been desired to provide a way or means of attaching valves and fittings which pass through an aperture in the wall of a tank having an imbedded vapor barrier in a manner which prevents permeation and escape of vapor through the area of the aperture upon attachment of a fitting thereto. It has also been desired to provide a way or means for mechanically attaching a pass-through fitting to the tank and to provide a vapor impervious connection without the necessity of weldment of the pass-through to the tank.

BRIEF SUMMARY OF THE INVENTION

The present invention provides a means of attaching a pass-through in the form of a valve or fitting to the wall of a plastic fuel tank having an embedded vapor barrier layer in the wall thereof and in a manner which provides for mechanical attachment of the pass-through and provides a vapor impervious seal for the fitting or pass-through. An aperture is formed through the tank wall exposing the edge of the vapor barrier layer and a locking ring is welded about the aperture to the outer surface of the tank wall. The locking ring is provided with undercut inwardly extending lugs spaced circumferentially about the inner periphery. A fitting or pass-through has an annular seal ring located thereon so as to engage the edge of the vapor barrier layer upon mechanical attachment of the fitting to the locking ring. In the presently preferred practice the fitting has projections thereon to enable axial insertion and twist locking of the fitting projections with the lugs on the locking ring on the tank.

DETAILED DESCRIPTION OF THE INVENTION

Figure 1:
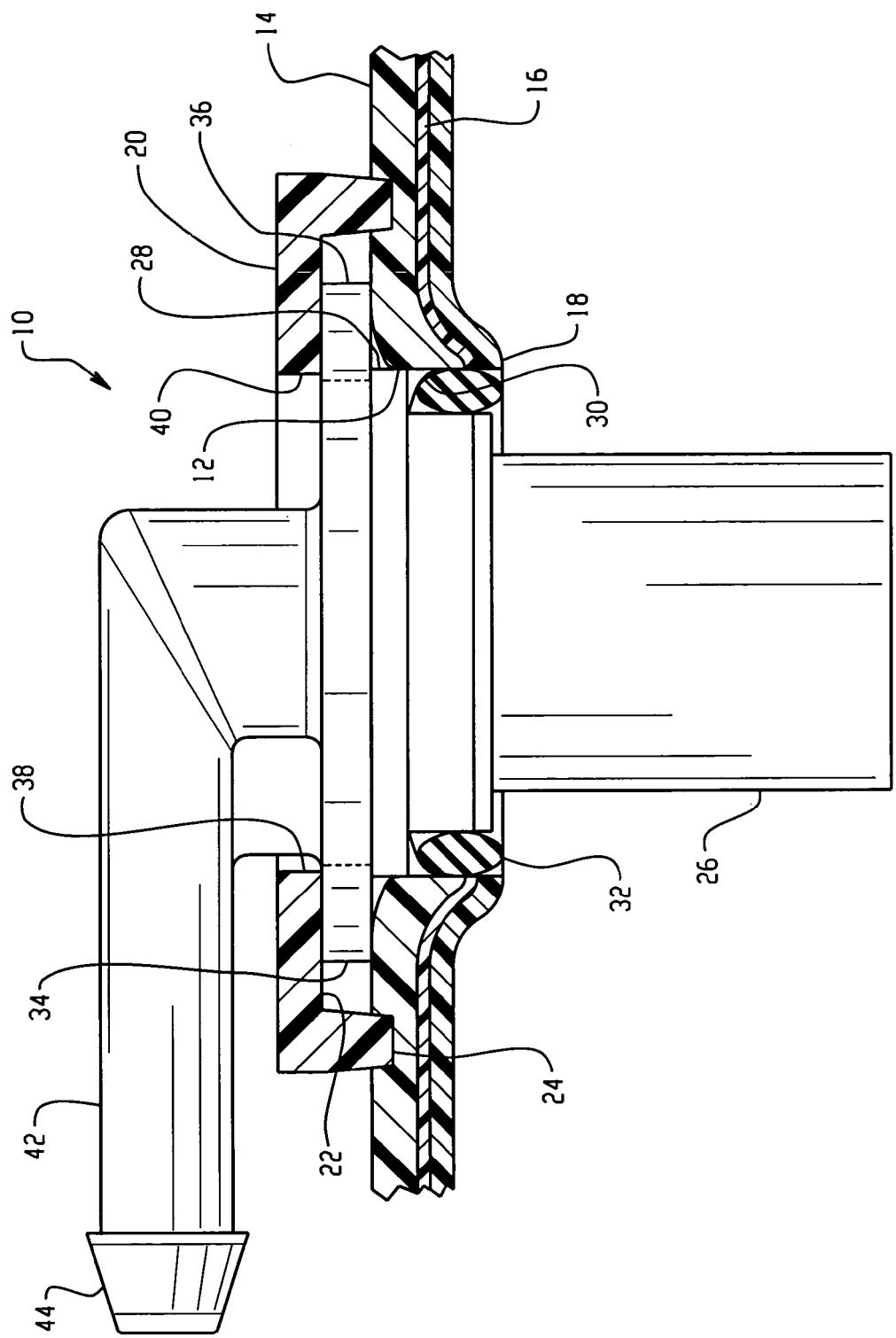
FIG. 1 is a cross-section taken through a float operated valve installed in the wall of a fuel tank employing the mechanical attachment of the present invention; and, FIG. 2 is an exploded view of another embodiment of the inventions mechanically attaching a fuel filler tube assembly to a fuel tank.

Referring to FIG. 1 one embodiment of the present invention is shown indicated generally at 10 as a float operated vapor vent valve installed through an aperture 12 formed in the wall 14, generally by boring a hole, of a fuel tank formed of plastic material having an imbedded vapor impervious barrier layer 16 formed therein to prevent permeation and escape of fuel vapor through the tank wall.

If desired, the aperture 12 may be stiffened in the tank wall by the blow molding operation and may cause the material of the tank wall surrounding the aperture to be deformed or deflected inwardly to form a raised lip 18 annularly about the aperture on the inner surface of the tank wall. The edge of the vapor barrier layer 14 is thus exposed upon boring a hole about the inner periphery of the aperture 12 upon formation of the aperture.

An annular locking ring 20 has an undercut surface 22 formed thereon so as to provide an annular flange 24 about the face of the periphery of the ring, which flange 24 is secured to the outer surface of the tank wall 14 by weldment.

In the embodiment of FIG. 1, the pass-through comprises a vent valve 26, typically of the float operated type, which has an enlarged diameter portion 28 formed thereon which is sized and configured to closely interfit the aperture 12 when the valve 26 is received therethrough. An annular resilient seal ring 32 is disposed in radial compression between the aperture 12 and a shoulder 30 formed on the valve body below portion 28 with the outer periphery of the seal ring located thereon so as to seal over the edge of the barrier layer 16 exposed within aperture 12. Exact shape of rubber seal cross-section may vary to suit application.

Valve 26 has an outwardly extending flange 32 which has a plurality of circumferentially spaced radially outwardly extending locking lugs 34, 36 provided thereon which engage corresponding radially inwardly extending and circumferentially spaced projections 38, 40 formed on the locking ring 20. Thus, the valve 26 may be inserted in the aperture with the projection 34, 36 moved axially in the spaces between the inwardly extending projections 38, 40 and rotated for twist locking engagement therewith. Valve 26 has an outwardly extending nipple 42 with an annular barb 44 provided on the end thereof for permitting attachment of a hose thereon for controlling escape of fuel vapor from within the tank through fitting 42 to an external collector (not shown). Other means of sealing such as "quick connects" will work as well.

Figure 2:
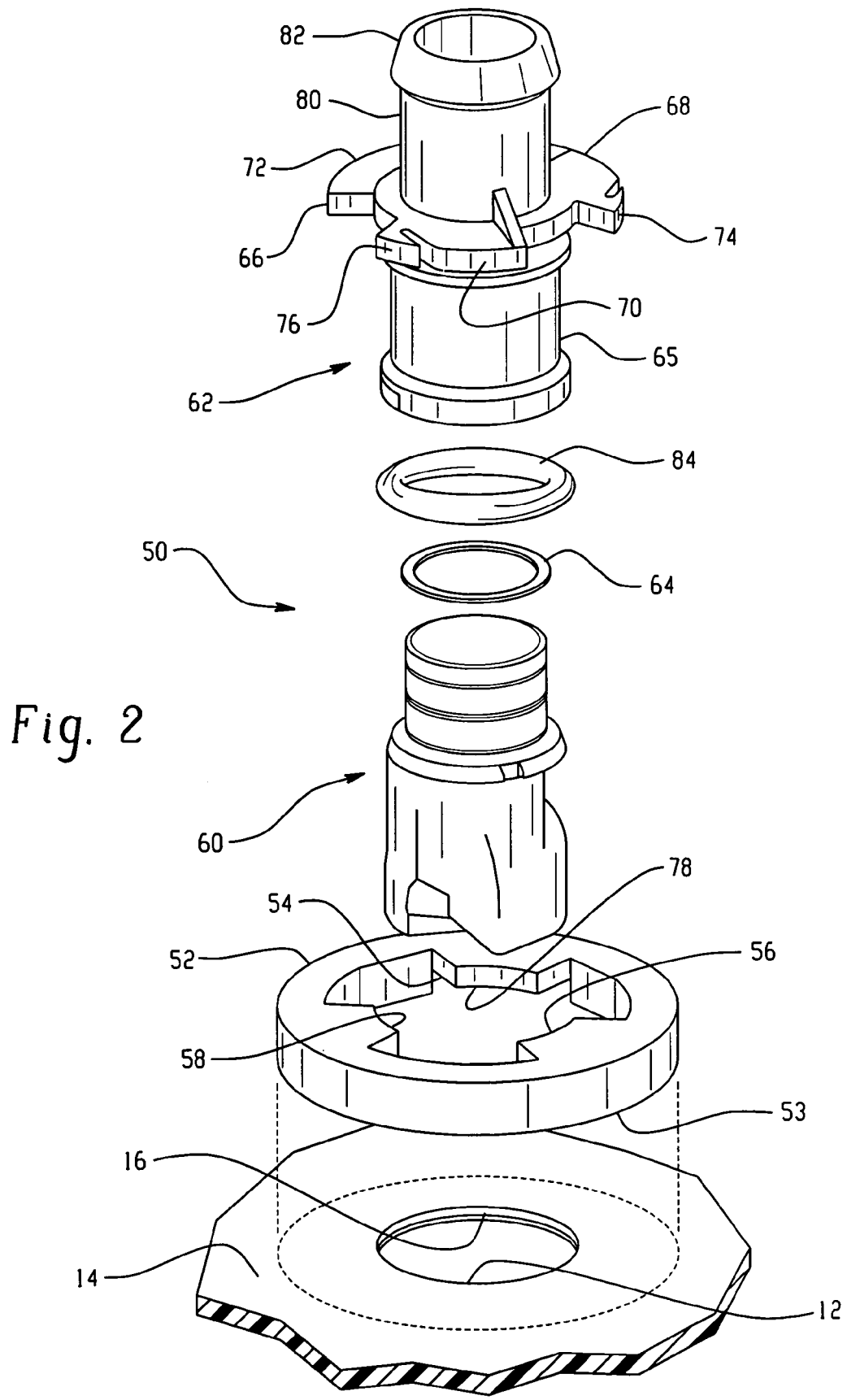

Referring to FIG. 2, another embodiment of the invention employing a filler tube assembly is indicated generally at 50 wherein tank 14 has a locking ring 52 secured over the tank aperture 12 by weldment as was done in the embodiment 10 of FIG. 1. Locking ring 52 has a plurality of radially inwardly extending circumferentially spaced locking lugs 54, 56, 58 disposed thereabout in circumferentially spaced arrangement. Ring 52 is axially undercut to provide a space between the lugs 54 through 58 and the outer surface of the tank 14 in the region about the aperture 12 and to form annular rib 53 for weldment to the wall of tank 14.

The filler tube assembly of embodiment 50 of the present invention includes a one way valve assembly indicated generally at 60 and a spud indicated generally at 62 which is disposed over the upper end of the valve 60 in telescoping arrangement and sealed thereon by an annular seal ring 64.

The spud 62 has a cylindrical portion 66 thereof which is adapted to be received axially within the inner periphery of the lugs 52 through 58 in the locking ring. Spud 62 has a flange portion with three radially outwardly extending lugs 66 through 70 spaced peripherally thereabout and configured to pass axially through the spaces between the lugs 52 through 58 in the locking ring. Each of the projections 66 through 70 has provided on the outer periphery thereof a resiliently flexible pawl, denoted respectively 72 through 76, which is arranged to engage ratchet teeth such as those denoted by reference numeral 78 formed in the locking ring in the undercut region of projection 54. The pawls each engage the ratchet teeth upon twist locking of the spud 62 into the aperture 12 such that reverse rotation and removal therefrom is prevented. The spud 62 has an upper tubular portion 80 which is adapted to have a flexible hose or tubing received thereover and retained thereon and includes an annular rib or barb 82 formed about the end thereof for facilitating hose attachment thereto.

The lower portion 65 of the filler tube assembly 62 has a seal ring 84 disposed thereabout for sealing between the lower portion 65 and the inner periphery of aperture 12 and vapor barrier 16 in a manner similar to that shown for the embodiment 10 of FIG. 1.

The present invention thus provides a simple, low cost and effective way of mechanically attaching and retaining a pass-through on an aperture formed on the wall of a plastic fuel tank having a vapor barrier exposed at the aperture.

Although the invention has hereinabove been described with respect to the illustrated embodiments, it will be understood that the invention is capable of modification and variation and is limited only by the following claims.

What is claimed is:

1. A method of mounting a pass-through on a plastic fuel tank comprising:

forming an access opening in the wall of the tank, the access opening having an edge;

disposing a locking ring over the access opening and attaching the ring to the exterior of the tank, the locking ring having an undercut surface;

providing a pass-through with a resilient sealing ring thereon;

disposing at least one ratcheting surface on one of the pass-through and the locking ring and at least one pawl on the other of the pass-through and the locking ring;

disposing a portion of the pass-through in the access opening and locating the sealing ring on the edge of the access opening; and, securing the pass-through against the undercut surface of the locking ring by twist locking the pass-through in the locking ring and preventing twisting in a reverse direction and retaining the sealing ring against the edge of the access opening.

2. The method defined in claim 1, wherein said step of providing a pass-through includes providing a vent valve.

3. The method defined in claim 1, wherein the step of disposing a locking ring includes disposing a locking ring formed of the same plastic material as the fuel tank.

4. The method defined in claim 1, wherein the step of providing a pass-through includes forming an annular groove on the pass-through and disposing an O-ring in the groove.

5. The method defined in claim 1, wherein the pass-through is a spud, and wherein the step of providing a pass-through includes inserting and twist locking a one-way valve in the spud.

6. The method defined in claim 5, wherein the step of inserting a one-way valve includes disposing an annular seal between the pass-through and the one-way valve.

7. The method defined in claim 1, wherein the locking ring is first mechanically attached to the pass through and subsequently attached in place on the fuel tank during insertion of the pass-through the access opening.

8. The method of claim 1, wherein the fuel tank has an embedded vapor barrier, wherein the step of forming an access opening includes exposing an edge of the vapor barrier at the edge of the access opening.

9. The method of claim 8, wherein the step of locating the sealing ring includes locating the sealing ring on the exposed edge of the vapor barrier.

* * * * *